United States Patent
Tsuboi et al.

(10) Patent No.: US 7,130,014 B2
(45) Date of Patent: *Oct. 31, 2006

(54) LIQUID CRYSTAL DISPLAY DEVICE WITH PARTICULAR ELECTRODE TAPER USING SWITCHING DEVICES AND A METHOD OF MANUFACTURING THE SAME

(75) Inventors: Hisanori Tsuboi, Kanagawa (JP); Fumiaki Abe, Kanagawa (JP); Katsuhide Uchino, Kanagawa (JP); Kazuhiro Noda, Kanagawa (JP); Hideshi Sugita, Kagoshima (JP); Tadahiro Hagita, Kagoshima (JP); Hiromi Fukumori, Miyazaki (JP); Syuichi Shima, Kanagawa (JP); Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 11/044,793

(22) Filed: Jan. 27, 2005

(65) Prior Publication Data

US 2005/0134778 A1   Jun. 23, 2005

Related U.S. Application Data

(60) Continuation of application No. 10/236,744, filed on Sep. 6, 2002, now abandoned, which is a division of application No. 09/795,387, filed on Feb. 28, 2001, now abandoned.

(30) Foreign Application Priority Data

Feb. 29, 2000  (JP) ............................ P2000-054843
Apr. 4, 2000   (JP) ............................ P2000-102790

(51) Int. Cl.
*G02F 1/13*   (2006.01)

(52) U.S. Cl. ...................................... 349/187
(58) Field of Classification Search ..................... None
See application file for complete search history.

(56) References Cited

U.S. PATENT DOCUMENTS

| 5,483,366 A | 1/1996 | Atherton |
| 5,490,002 A | 2/1996 | Nicholas |
| 5,585,951 A | 12/1996 | Noda et al. |
| 5,734,448 A | 3/1998 | Cheng |
| 5,781,262 A | 7/1998 | Suzuki et al. |
| 5,936,685 A | 8/1999 | Ito et al. |
| 6,088,070 A | 7/2000 | Ohtani et al. |

(Continued)

*Primary Examiner*—Frank G. Font
*Assistant Examiner*—Timothy Rude
(74) *Attorney, Agent, or Firm*—Robert J. Depke; Rockey, Depke, Lyons & Kitzinger LLC

(57) ABSTRACT

A matrix-addressed type liquid crystal display apparatus having switching devices such as TFTs is provided, featuring that an increased effective voltage can be applied without causing hysteresis in V-T characteristics. Namely, by substantially increasing a value of an applicable voltage in excess of which a display defect starts to appear, a high numerical aperture and a high contrast ratio have been achieved at the same time. In the LCD apparatus of the present invention, a gap between adjacent reverse tilt domains each formed in a portion of a pixel which is arranged corresponding to an arbitrary pixel electrode becomes broader than a minimum gap between adjacent pixel electrodes corresponding thereto, or a thickness of a liquid crystal cell in the portion between adjacent reverse tilt domains is set thinner than a thickness of a liquid crystal cell in the portion of the pixel.

10 Claims, 7 Drawing Sheets

U.S. PATENT DOCUMENTS

| | | |
|---|---|---|
| 6,115,087 A | 9/2000 | Ohi |
| 6,141,077 A | 10/2000 | Hirata et al. |
| 6,147,722 A | 11/2000 | Shimada et al. |
| 6,242,061 B1 | 6/2001 | Gibbons et al. |
| 6,259,494 B1 | 7/2001 | Kawai et al. |
| 6,266,058 B1 | 7/2001 | Meyer |
| 6,327,013 B1 | 12/2001 | Tombling et al. |

PRIOR ART

LIQUID CRYSTAL DISPLAY DEVICE WITH PARTICULAR ELECTRODE TAPER USING SWITCHING DEVICES AND A METHOD OF MANUFACTURING THE SAME

The subject matter of application Ser. No. 10/236,744 is incorporated herein by reference. The present application is a continuation of U.S. application Ser. No. 10/236,744, filed Sep. 6, 2002 now abandoned, which is a Divisional of application Ser. No. 09/795,387, filed Feb. 28, 2001 now abandoned, which claims priority to Japanese Patent Application No. JP2000-054843, filed Feb. 29, 2000, and Japanese Patent Application No. JP2000-102790, filed Apr. 4, 2000. The present application claims priority to these previously filed applications.

BACKGROUND OF THE INVENTION

1. Field of the Invention

The present invention relates to a liquid crystal display apparatus having a plurality of pixel electrodes formed in a matrix pattern, and using switching devices such as thin film transistors (TFTs).

2. Description of the Related Art

A conventional matrix addressed-type liquid crystal display apparatus using switching devices such as TFTs is provided with a liquid crystal cell sandwiched between two sheets of polarizers, in which the liquid crystal cell itself is comprised at least of: a pair of transparent glass substrates disposed so as to oppose to each other; a transparent common electrode disposed on an opposing surface of one of the pair of the transparent glass substrates, and covered with an orientation film; a plurality of transparent pixel electrodes disposed in a matrix pattern on an opposing surface of the other one of the pair of the transparent glass substrates, and covered with an orientation film; TFTs each connected to each pixel electrode as a switching device; and a twisted nematic (TN) liquid crystal sealed between the two opposed orientation films. This type of liquid crystal cell is generally referred to as a twisted nematic liquid crystal display (TN-LCD).

By way of example, when applying a voltage to the pixel electrodes disposed in a matrix pattern, there is widely used such a method as the line reverse drive method whereby a voltage to be applied is reversed per each line or the column reverse drive method whereby a voltage to be applied is reversed per each column in order to be able to improve the quality of display. These drive methods, however, have such a problem-that due to a reversed application of voltage between adjacent pixel electrodes, there arises a reverse tilt domain 61, the tilt direction of which is reverse to a pre-tilt direction which is originally given to the liquid crystal, in a portion within a pixel which is arranged corresponding to each pixel electrode 62 as shown in FIG. 6 (refer to Japan Patent Publication No. 2934875, being a basic-application of U.S. Pat. No. 5,781,260 and U.S. Pat. No. 6,011,604, col. 5-6). In particular, in a normally-white mode liquid crystal display, there occurs a problem that a disclination line 63 which is located at a boundary between a normal region and the reverse tilt domain 61 is caused to have a white stripping defect thereby deteriorating contrast. Thereby, in order to reduce the region of the reverse tilt domain 61, there has been practiced to increase its tilt angle. However, this causes a problem to drop the yield at the time of manufacture. Further, in order to minimize light leakage therefrom, a shade material is disposed corresponding to a portion where reverse tilt domain 61 is formed. However, this causes a problem to drop a numerical aperture.

Thereby, as one of the methods to be able to increase a contrast ratio in the TN-LCD, it is considered promising to increase an effective voltage to be applied across its common electrode and pixel electrode which are disposed opposingly (i.e., to broaden its dynamic range). In such a case in which the effective voltage to be applied across the common electrode and the pixel electrode opposing to each other is increased, there are such advantages that the orientation of liquid crystal molecules becomes more perpendicular, and in addition that because the position of occurrence of disclination line 63 is shifted toward a peripheral (outer) direction within the pixel, the contrast ratio can be improved.

However, if this effective voltage is increased substantially, the reverse tilt domain will disappear in a part of the pixels, and because this disappearance of the reverse tilt domain in the part thereof will become a quasi-stable state, there occurs a hysteresis in V (Voltage)-T (Transmitted light strength) characteristics (refer to FIG. 7). Thereby, a significant deterioration in quality of display occurs resulting from a display defect like a dead pixel at the time of switching from black to half tone displays, or in particular, resulting from a display defect like a dead line which is caused by propagation of a display defect due to arbitrary reverse tilt domain to its adjacent reverse tilt domain. Therefore, it has not been possible to apply an effective voltage in excess of a predetermined value across the common electrode and the pixel electrode which are opposed to each other, thereby failing to realize a desired contrast ratio. These problems described above become more significant when a gap between juxtaposed pixel electrodes is reduced in order to realize a liquid crystal display device having a high resolution and a high numerical aperture. Therefore, in the matrix-addressed type liquid crystal display apparatus provided with switching devices such as TFTs, it has been difficult to accomplish a high numerical aperture and a high contrast ratio simultaneously.

SUMMARY OF THE INVENTION

The present invention has been contemplated to solve the above-mentioned problems associated with the prior art. An object of the invention, therefore, is to provide for a matrix-addressed type liquid crystal display apparatus provided with switching devices such as TFTS, wherein its effective voltage is substantially increased without causing hysteresis to occur in the V-T characteristics, namely, to be able to increase a value of applicable voltage, in excess of which a display defect starts to occur, thereby enabling both a high numerical aperture and a high contrast ratio to be achieved simultaneously, and further providing for a method of manufacture of the same.

In order to ensure for a high numerical aperture and a high contrast ratio to be achieved simultaneously, i.e., to be able to achieve both of them coincidently in the matrix-addressed type liquid crystal display apparatus having switching devices such as TFTs, the inventors of the present invention have discovered that it is effective to minimize an interaction occurring between a reverse tilt domain that is formed within a pixel arranged corresponding to an arbitrary pixel electrode and an adjacent reverse tilt domain that is formed within an adjacent pixel arranged corresponding to an adjacent pixel electrode, more particularly that it is preferable to separate respective juxtaposed reverse tilt domains physically from each Other, i.e., to space apart respective juxtaposed reverse tilt domains at a distance which is broader than a minimum gap between juxtaposed pixel electrodes corresponding thereto, otherwise that it is effective to reduce a thickness (between the opposed orientation films) of the liquid crystal cell in a portion sandwiched between juxtaposed reverse tilt domains thinner than a thickness of the liquid crystal cell in a portion of the pixel so that a degree of overlap between respective cross-sections of juxtaposed reverse tilt domains in the direction of thickness is minimized.

According to one aspect of the present invention, a liquid crystal display apparatus is provided with a liquid crystal cell which is at least comprised of: a pair of substrates disposed so as to oppose each other; a common electrode which is provided on one of the pair of substrates, and covered with a first orientation film; a plurality of pixel electrodes disposed in a matrix pattern on the other of the pair of substrates, and covered with a second orientation film; a switching device connected to each pixel electrode; and a liquid crystal which is sealed in a space sandwiched between the first and second orientation films provided on the pair of substrates, wherein:

a gap of adjacent reverse tilt domains each formed in a portion of a pixel which is arranged corresponding to an arbitrary pixel electrode is set broader than a minimum distance between juxtaposed pixel electrodes corresponding thereto; or a thickness of a liquid crystal cell in a portion sandwiched between the adjacent reverse tilt domains is set thinner than a thickness of a liquid crystal cell in a portion of the pixel.

In order to broaden the gap between the adjacent reverse tilt domains than the minimum gap between the juxtaposed pixel electrodes, it is preferable to set a width of the pixel electrode in a longitudinal direction of the reverse tilt domain narrower than a width of the pixel electrode in a portion in which no reverse tilt domain is formed. Thereby, the adjacent reverse tilt domains can be separated farther from each other in the longitudinal directions. Alternatively, respective pixel electrodes may be arranged in a zigzag or staggered pattern like hound's tooth to the same effect. Thereby, the adjacent reverse tilt domains can be separated farther from each other in the directions orthogonal to the longitudinal direction thereof.

Further, in order to set the thickness of the liquid crystal cell sandwiched in the portion between adjacent reverse tilt domains thinner than the thickness of the liquid crystal cell sandwiched in the portion of the pixel, preferably a barrier portion is formed in the region of the adjacent reverse tilt domains so that the thickness of the liquid crystal cell therein is reduced. For example, such a barrier portion can be formed when perforating a contact hole into a planar film, which is normally formed prior to forming the pixel electrodes. However, it is not limited thereto, and any other modifications thereof can be provided within the scope of the invention.

Still further, according to another aspect of the invention, a method of fabricating a substrate on the side of switching devices for use in the liquid crystal display apparatus of the invention is provided, comprising the following steps (a)–(e):

(a) forming a first layer-insulation layer on its substrate, forming a thin film of Si layer for forming a transistor thereon, forming an oxide film on the surface thereof, constructing a thin film transistor by forming a gate electrode and a Cs electrode thereon, and further forming second layer-insulation layer on the thin film transistor;

(b) forming an antireflection film on an entire area of the second layer-insulation layer;

(c) perforating a contact hole through the antireflection film and the second layer-insulation layer to the thin film of Si layer;

(d) forming a first wiring layer into the contact hole; and further (e) a process including the steps of: forming a third layer-insulation layer on an entire area thereof; forming a passivation film; then, removing the passivation film by etching corresponding to a contact hole portion and a pixel aperture portion; removing the third layer-insulation layer by etching corresponding to the contact hole portion; forming a second wiring layer therein; forming a planar organic film on an entire area thereof; then perforating a contact hole corresponding to a pixel electrode into the planar organic film; and forming a pixel electrode thereon in such a manner that a gap between adjacent reverse tilt domains each formed in a portion of a pixel arranged corresponding to an arbitrary pixel electrode becomes broader than a minimum gap between juxtaposed pixel electrodes corresponding thereto, otherwise:

at the time of perforating the contact hole for the pixel electrode in the planar organic film prior to forming the pixel electrode thereon, fabricating the planar organic film so that the thickness of the liquid crystal cell in the portion sandwiched between adjacent reverse tilt domains becomes thinner than the thickness of liquid crystal cell in the portion of the pixel.

BRIEF DESCRIPTION OF DRAWINGS

Other features and advantages of the present invention will become apparent from the following description taken in connection with the accompanying drawings, in which.

A PREFERRED EMBODIMENT OF THE INVENTION

A preferred embodiment of the invention will be described in the following with reference to the accompanying drawings.

Figure 1:
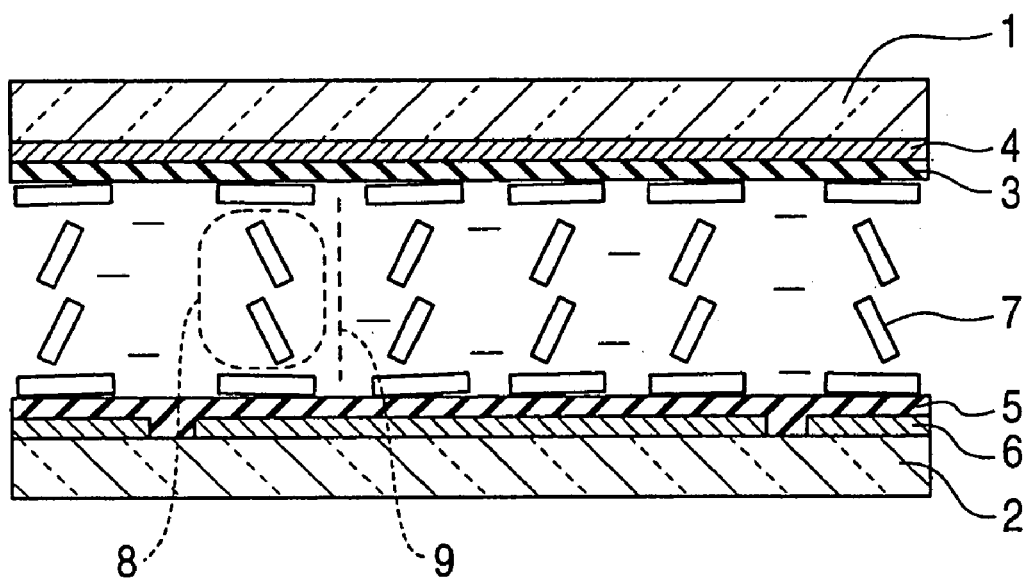
FIG. 1 is a schematic diagram in cross-section of a liquid crystal cell of a liquid crystal display apparatus (LCD) of the present invention.

A liquid crystal display element according to the present invention is provided with a liquid crystal cell, which is sandwiched between two sheets of polarizers, and this liquid crystal cell itself is comprised at least of: a pair of transparent glass substrates (an upper substrate 1 and a lower substrate 2); a common electrode 4 provided on a bottom surface (opposing surface) of the upper substrate 1, and covered with an orientation film 3; a plurality of transparent pixel electrodes 6, which are arranged in a matrix on an upper surface (opposing surface) of the lower substrate 2, and covered with an orientation film 5; a TFT (not shown) connected to each pixel electrode as its switching device; and twisted nematic liquid crystals 7 sealed in a space between the orientation films 3 and 5, and twisted continuously approximately 90° therebetween, as shown in FIG. 1.

In such a liquid crystal cell, there are formed scanning lines and signal lines (not shown) in a matrix on the upper surface (opposing-surface) of the lower substrate 2, and each pixel electrode 6 is connected via a corresponding TFT to the scanning line and signal line, respectively. In this liquid crystal cell, a reverse tilt domain 8 is univocally formed, relative to a disclination line 9 which is its boundary, depending on its orientation treatment direction and its voltage drive method adopted (whether the line reverse drive method or the column reverse drive method is used).

In the liquid crystal display apparatus of the present invention, in order for a high numerical aperture and a high contrast ratio to be achieved simultaneously by minimizing an interaction between adjacent reverse tilt domains each formed within a pixel arranged corresponding to an arbitrary pixel electrode, a gap between adjacent reverse tilt domains is increased broader than a minimum gap between juxtaposed pixel electrodes, or a thickness of the liquid crystal cell in a portion between adjacent reverse tilt domains (i.e., a depth thereof between the opposed orientation films) is reduced shallower than a thickness of the liquid crystal cell in the other portion of the pixel.

Figure 2A:
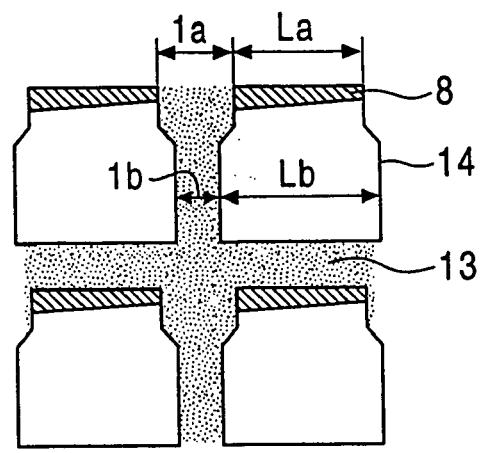
FIGS. 2A to 2C are schematic plan views of pixel electrodes in a liquid crystal cell for use in the LCD of the present invention.
Figure 2B:
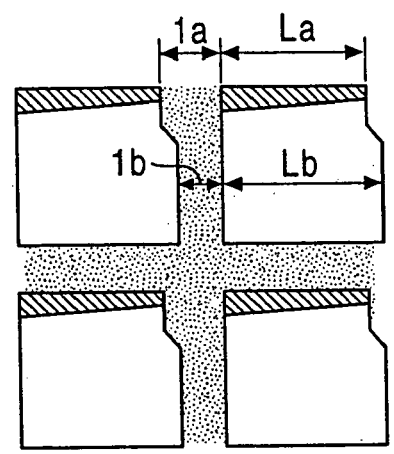
Figure 2C:
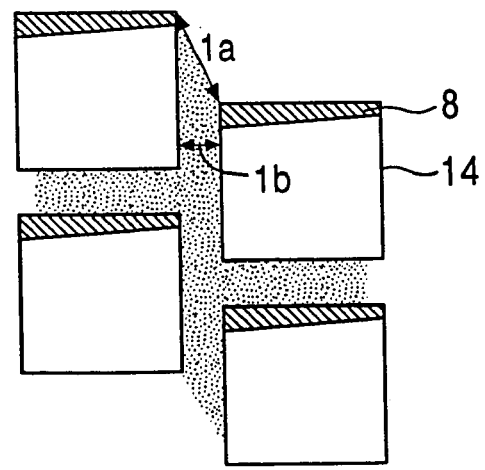

FIGS. 2A and 2B show specific methods for broadening gap 1a between adjacent reverse tilt domains broader than minimum gap 1b between adjacent pixel electrodes, wherein -in order for adjacent reverse tilt domains to be separated from each other in longitudinal directions, a width of pixel electrode La (which corresponds to a width of a region of a reverse tilt domain 8 in a longitudinal direction thereof) in a pixel electrode 14 enclosed by a shadow region 13 is set narrower than a width Lb of the pixel electrode in a portion corresponding to its normally-tilt domain in which no reverse tilt domain 8 is formed. Further, as shown in FIG. 2C, in order to separate them in a direction orthogonal to the longitudinal direction as well, pixel electrodes 14 may be arranged in a staggered pattern like hound's tooth check. In the case of FIG. 2C, because an overlap region in cross-section between opposing end portions of adjacent reverse tilt domains 8 is reduced also, an effect further to reduce the interaction between adjacent reverse tilt domains 8 is expected to be achieved.

Figure 3A:
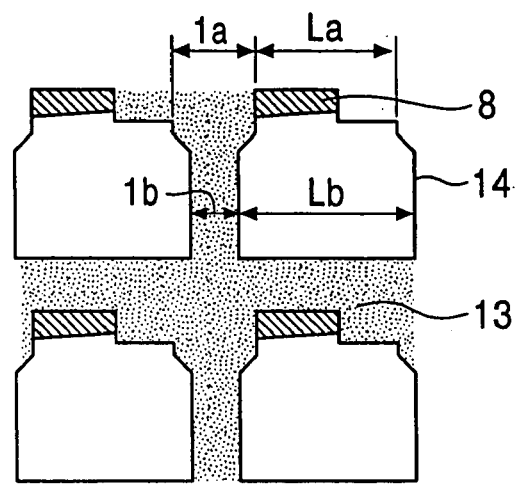
FIGS. 3A to 3C are schematic plan views of pixel electrodes in a liquid crystal cell for use in the LCD of the present invention.
Figure 3B:
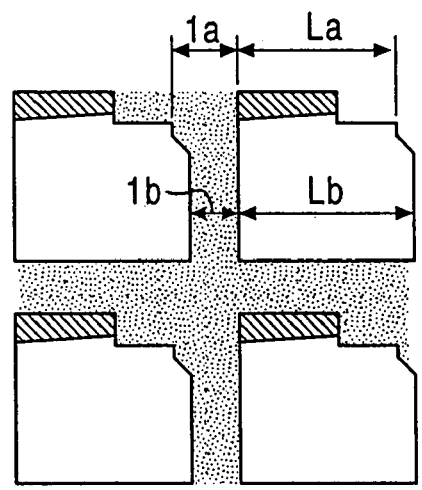
Figure 3C:
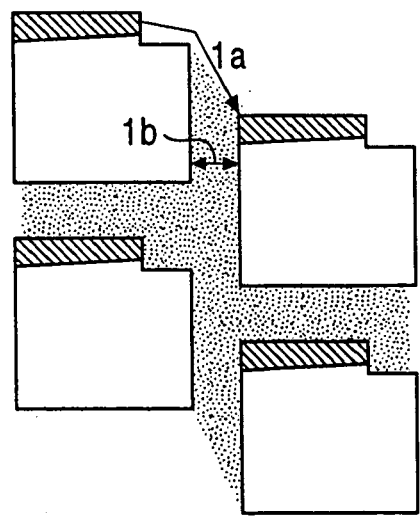

Still further, according to the knowledge and understanding by the inventors of the present invention, it is learned that there exists a close relationship between an effective voltage applicable across the common electrode and the pixel electrode disposed so as to oppose to each other and a gap between juxtaposed pixel electrodes in an orthogonal direction to the longitudinal direction of the reverse tilt domain, and if this gap is broadened, the effective voltage applicable can be increased also. However, it should be noted that if this orthogonal gap is merely broadened, an area of the shadow region would be broadened thereby failing to realize the high numerical aperture aimed at by the present invention. Therefore, as regard to the embodiment as shown in FIGS. 2A to 2C, it is preferable for the gap between the adjacent pixel electrodes to be broadened partially also in the orthogonal direction relative to the longitudinal direction of the reverse tilt domain as shown in FIGS. 3A to 3C, respectively. In this instance, a portion preferred for broadening the gap is a portion of the pixel electrode on one side thereof corresponding to one end of reverse tilt domain 8 having a smaller cross-section as shown in FIGS. 3A to 3C in order to maintain a high numerical aperture and to cause an asymmetrical generation of the reverse tilt domains. However, it is not limited thereto, and the gap may be expanded by cutting away at a position corresponding to the middle of the reverse tilt domain. As for its size (depth and width) to be expanded may be determined appropriately in consideration of a required numerical aperture and so on.

Still further, as a concrete method for setting the thickness of the liquid crystal cell sandwiched within between adjacent reverse tilt domains thinner than the thickness of the liquid crystal cell in the pixel portion, a barrier portion (not shown) may be formed for reducing the thickness of the liquid crystal cell sandwiched between the adjacent reverse tilt domains. This barrier portion may be formed as a convex or elevated part on the substrate at the time of forming switching devices such as TFT elements, or a barrier structure may be formed after the formation of the orientation film, thereon by printing or dispensing processes.

The liquid crystal to be used here is preferably twisted nematic liquid crystals the major axis of liquid crystal molecules of which is continuously twisted approximately 90° between the opposed orientation films. Further, the liquid crystal cell is preferably provided with a black matrix for shading at least a part of the periphery of each pixel portion. A thickness of the liquid crystal cell in the pixel portion is preferably 4 µm or less. Further, a size of the pixel electrode is preferably 5 $\mu m^2$–50 $\mu m^2$.

EXAMPLES

Examples of the preferred embodiments of the invention will be described more specifically with reference to the accompanying drawings (in which a width of the pixel electrode corresponding to the region of the reverse tilt domain is narrowed than the width thereof corresponding to the region of the normal tilt domain).

Figure 4A:
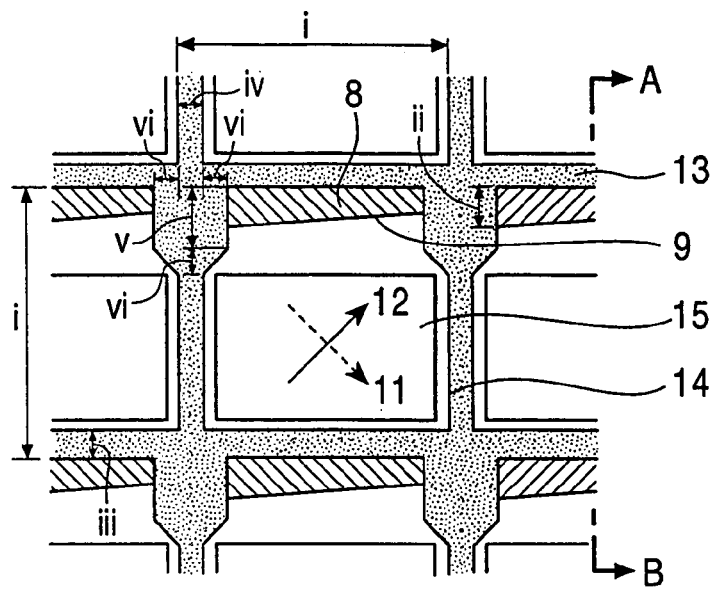
FIGS. 4A to 4B are plan views of the liquid crystal cell for use in the LCD of the present invention.

FIG. 4A is an example of plan views as seen from the above of a TN-LCD portion of a liquid crystal display apparatus of the present invention, however, its TFTs, signal lines and scanning lines are not shown. By way of example, a cross-section cut out along the line A–B in FIG. 4A) is the same as that of FIG. 1.

In TN-LCD shown in FIG. 4A, a dotted arrow 11 and a solid arrow 12 depict directions of orientation processing (directions of rubbing) on the lower substrate and the upper substrate, respectively. In the shadow region 13, there are provided a signal line, a scanning line, an auxiliary capacitance electrode, and a TFT. Further, an aperture portion 15 is formed corresponding to the pixel electrode 14 formed on the lower substrate. The pixel electrode 14 is connected via the TFT to the signal line and the scanning line provided in the shadow region 13. A method adopted here for applying voltage to the pixel electrode 14 is a line reverse drive method which reverses a drive voltage per each line.

Further, a thickness of the liquid crystal cell in the pixel portion corresponding to the pixel electrode 14 (i.e., a depth in a direction between the opposing orientation films) is set at 3.5 µm. Anti-clockwise nematic liquid crystal is sealed between the upper and the lower substrates. The liquid crystal used here has a refraction anisotropy Δn of approximately 0.13, and dielectric constant anisotropy Δε of approximately 10. Further, polyimide films each having a pretilt angle of approximately 5° are used as the orientation films.

Figure 5A:
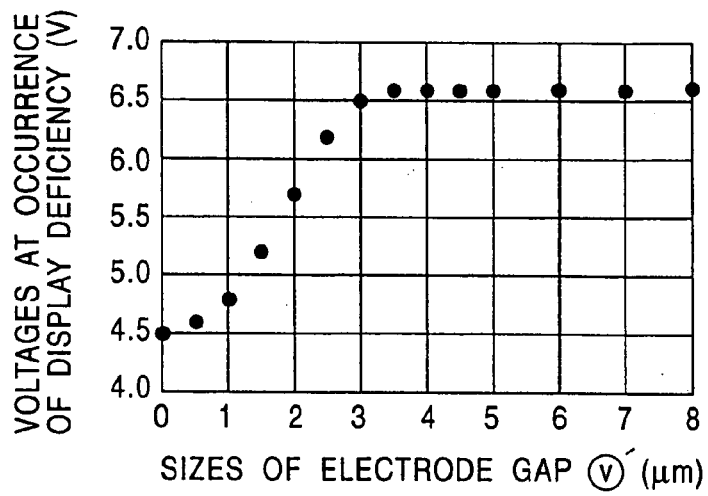
FIGS. 5A to 5C show a relationship of a distance between juxtaposed pixel electrodes versus an effective voltage in the liquid crystal cell for use in the LCD of the present invention.

In TN-LCD of FIG. 4A, a pixel pitch i is set at 20 μm, a pixel electrode gap iii in a vertical direction in the figure is set at 1.5 μm, and a minimum electrode gap iv between adjacent pixel electrodes in a horizontal direction is set at 1.5 μm. Then, a relationship between a drive voltage in excess of which a display defect will appear and an electrode gap v extended in the vertical direction or an electrode gap vi extended in the horizontal direction in its portion corresponding to the region of reverse tilt domain 8 is studied, respectively. Here, FIG. 5A shows a relationship between drive voltages in excess of which display defect appears and the electrode gap v which is varied while maintaining the electrode gap vi at 0.5 μm, and FIG. 5B shows a relationship between drive voltages in excess of which display defect appears and electrode gap vi which is varied while maintaining the electrode gap v at 3.5 μm.

Figure 5B:
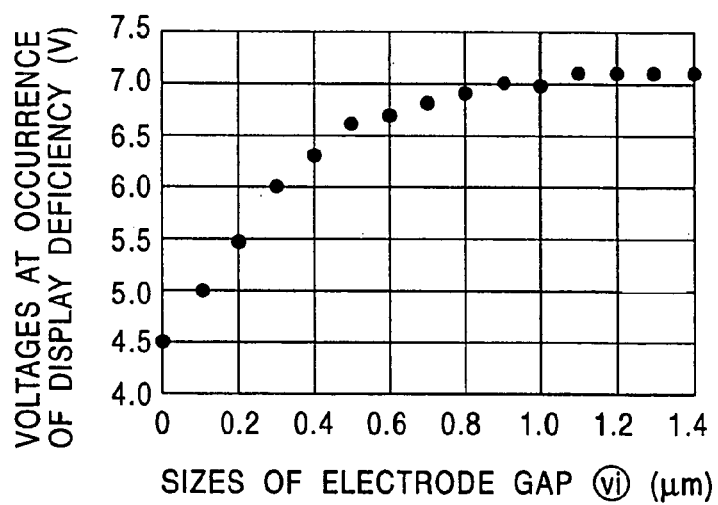

It is known from FIG. 5B that by broadening the electrode gap vi, a drive voltage (effective voltage) in excess of which display defect starts to appear can be raised. Further, it is known from FIG. 5A that by broadening the electrode gap v, a drive voltage (effective voltage) in excess of which display defect starts to appear can be raised. In this case, the electrode gap v is not necessary to extend in excess of 3.5 μm. As a result of observed positions of disclination line 9 in this liquid crystal cell, a width ii of the reverse tilt domain was found to be 3.0 μm. Thereby, it is known from FIG. 5A that when the electrode gap v extends more than the width ii of the reverse tilt domain, the drive voltage which is free from causing the display defect to appear will saturate.

Even in the TN-LCD as described above in which the distance between adjacent pixel electrodes was designed to become minimum in order to realize a high numerical aperture, if the pixel electrode patterning proposed by the present invention is adopted, a large drive voltage becomes applicable. More specifically, in this example, when the electrode gap v is set at 3.5 μm and the electrode gap vi is set at 0.5 μm, its drive voltage free from causing any display defect is improved from 4.5V to 6.6V thereby enabling a high contrast to be achieved.

Figure 4B:
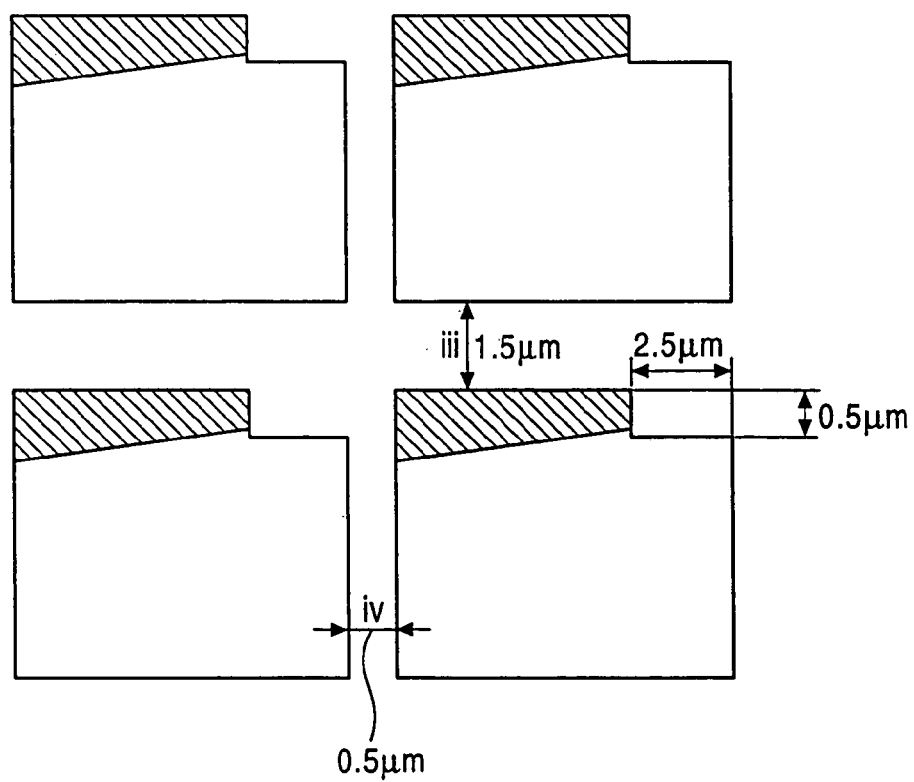
Figure 5C:
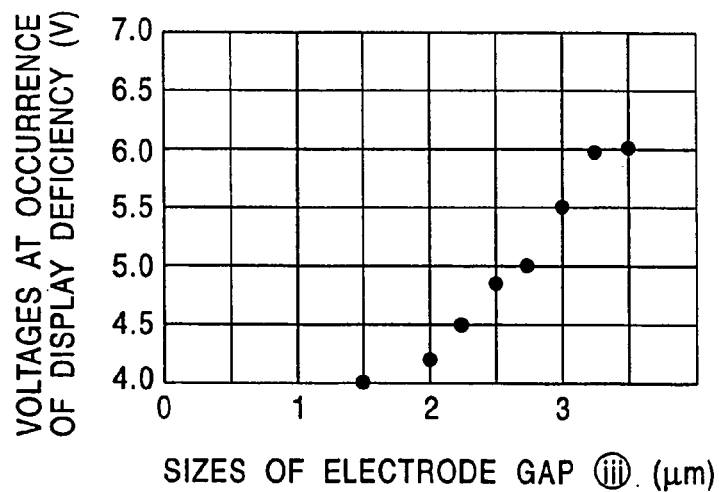
Figure 6:
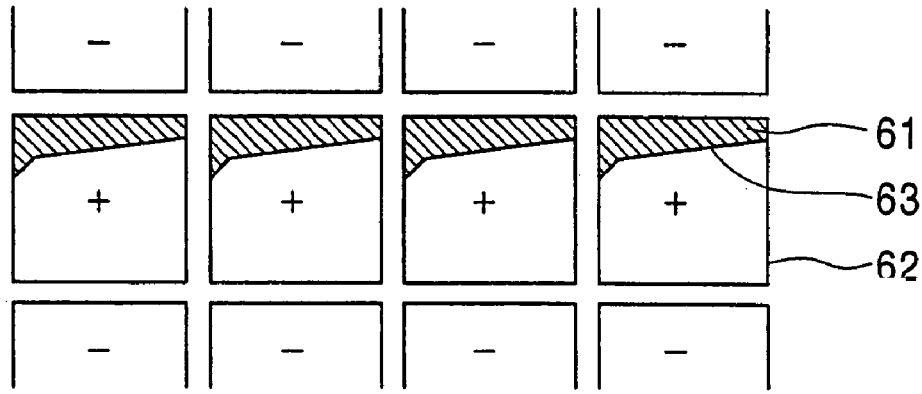
FIG. 6 depicts each reverse tilt domain generated in a prior art liquid crystal cell.
Figure 7:
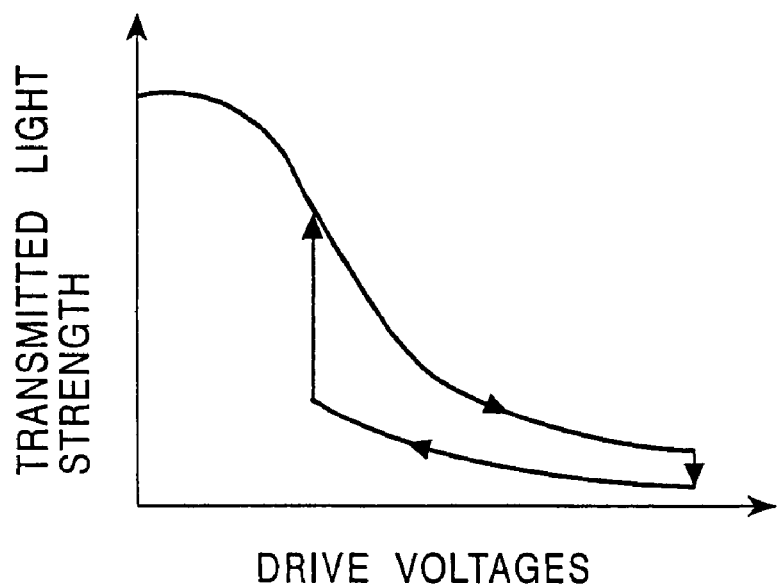
FIG. 7 depicts an example of hysteresis occurred between transmitted light strengths versus drive voltages in the prior art liquid crystal cell.

Further, in a case where the electrode gap iv is set at 1.5 μm, and the electrode gaps v and vi are set at 0 μm (in a case of a square pixel electrode), its diagram indicating a relationship between the electrode gap iii and the drive voltages free from causing display defect is shown in FIG. 5C. It is known from FIG. 5C that if the electrode gap iii is increased, its drive voltage (effective voltage) free from causing display defects can be raised. More specifically, in reference to FIG. 4B, assuming that the electrode gap iii to be 1.5 μm and the electrode gap iv to be 0.5 μm, when a portion of the electrode gap iii is further expanded as much as by an area of 2.5 μm (width)×0.5 μm (height), its drive voltage free from causing display defects is improved from 5.0V to 5.5V, thereby enabling a high contrast to be achieved. Therefore, it is known from the above that it is also preferable for the shape of the pixel electrode in the portion corresponding to the reverse tilt domain to be fabricated to have a cut-out portion not only in the horizontal direction but also in the vertical direction.

In addition, the liquid crystal display apparatus of the present invention also can use a non-linear element such as Metal-Insulation-Metal (MIM) and the like as its switching devices instead of TFTs. Further, the directions of rubbing at orientation processing, and twist angles of the liquid crystal described above are not limited thereto, and any other modifications can be applied within the scope of the invention. Still further, the advantages of the present invention can be applied also to a color display, a transmission type monochrome display, or a reflection type TN-LCD. Furthermore, the above-mentioned pretilt angle of 5° in the orientation films is not limited thereto.

Now, with reference to FIGS. 8A to 8E, a method of manufacturing a TFT substrate for use in the liquid crystal display apparatus of the present invention will be described according to respective steps in the following.

Figure 8A:
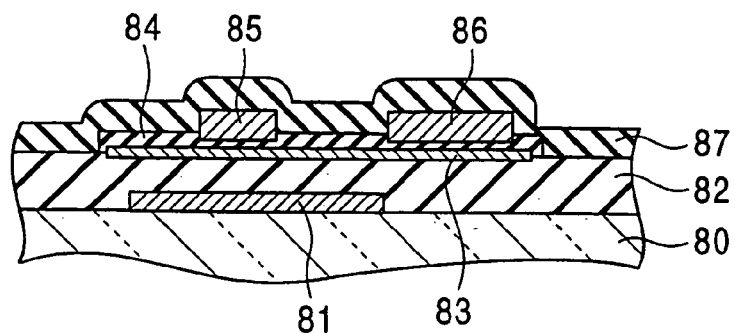
FIGS. 8A to 8E depict a process flow of manufacturing a TFT substrate for use in the present invention.

Step A: (FIG. 8A)

Firstly, on a surface of an insulating transparent substrate 80 such as a glass substrate or the like, a 50 nm thick film of poly-Si is formed by the low pressure chemical vapor deposition method (LP-CVD), on which a film of WSi is formed in 200 nm thickness, which is then patterned to form a multi-layered shadow film 81.

Upon this, a film of $SiO_2$ in 600 nm thickness is formed as an interlayer-insulation film 82 by the atmospheric pressure chemical vapor deposition method (AP-CVD). Subsequently, a thin film Si layer is grown to be 75 nm thick by LP-CVD for forming a transistor, then its crystal grains are grown by heat treatment or the like and patterned to form an Si layer 83. After that, by oxidizing the surface of the Si layer 83 an oxide film 84 is formed thereon, then for controlling a threshold voltage, a p-type impurity substance (B) is ion-implanted at a low density in an entire surface thereof.

Then, by masking a transistor portion, an n-type impurity substance (As) is ion-implanted at a high density exclusively in a Cs (Capacitance) portion to form an electrode, further on which, a second Si layer which becomes a gate electrode or Cs electrode is formed by LP-CVD, then subjected to a heat treatment in a gas such as $POCl_3$ so that phosphorus atoms are diffused to provide for a low resistivity, then the same is patterned to form a gate electrode 85 and a Cs electrode 86.

Then, for the purpose of forming an n-MOS, an n-type impurity substance (As) is ion-implanted at a high density after masking a p-MOS formed portion. Subsequently, for forming the n-MOS, after masking the pixel transistor portion and the n-MOS portion in the circuit, a p-type impurity substance (B) is ion-implanted at a high density. Then, an interlayer-insulation film 87 such as phosphorus silicate glass is formed to a thickness of 600 nm by AP-CVD, followed by a heat treatment to recover the crystalline property of the ion-implanted portion.

Figure 8B:
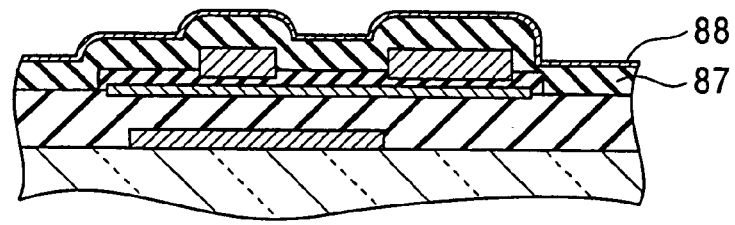

Step B: (FIG. 8B)

In the next step B, a TiON layer 88 for prevention of reflection is formed on the whole area of the interlayer-insulation film 87 by sputtering to a thickness of 35 nm.

Figure 8C:
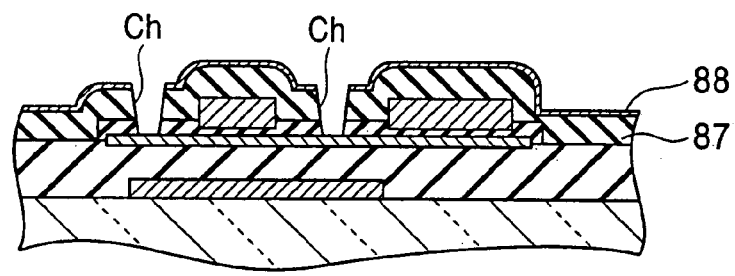

Step C: (FIG. 8C)

Further, in step C, after masking portions other than contact holes, the TiON layer 88 and the interlayer-insulation film 87 in the contact hole portion are etched to provide for a contact hole Ch.

Figure 8D:
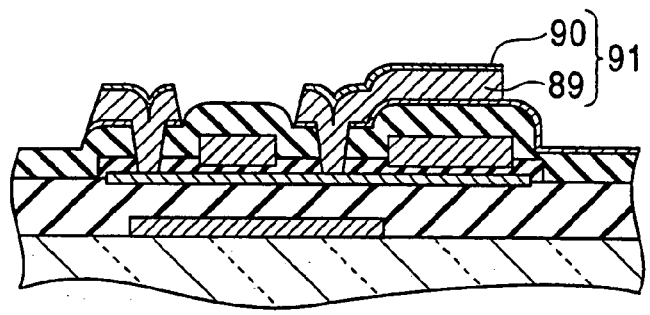

Step D: (FIG. 8D)

In the next step D, a 500nm thick Al-1% Si layer 89 and a 60 nm thick TiON layer 90 are continuously formed thereon by sputtering, then after masking a wiring portion by photolithography, a three-layer structured wiring of TiON/AlSi/TiON is patterned by dry-etching to form a wiring layer 91.

The 35 nm thick TiON layer 88 in the lower direction can efficiently absorb rays of light having a wavelength from 400 nm to 450 nm, and the 60 nm thick TiON layer 90 in the upper direction also functions as a stopper in a subsequent contact hole etching.

Figure 8E:
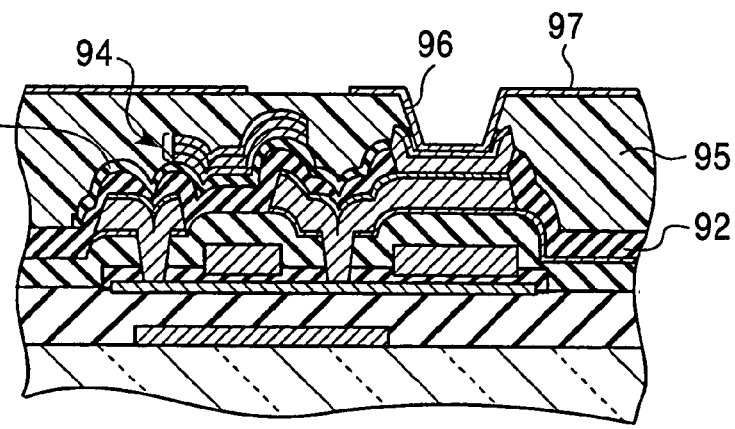

Step E: (FIG. 8E)

Further, in the step E, an interlayer-insulation film 92 such as a phosphorus silicate glass is grown by AP-CVD to 400 nm thick, and further, a 200 nm thick passivation film 93 of SiN is formed by the plasma CVD thereon. After etching the SiN film 93 on the contact hole portion, a pixel aperture portion and a PAD portion, the 400 nm thick interlayer-insulation layer 92 is perforated for the contact hole portion and the PAD portion. After that, in the same manner as in the above step D, a metal film of a TiON/AlSi/TiON structure: is formed, and patterned to provide for a wiring layer 94.

After recovery of transistor characteristics by heat treatment, an organic film 95 for planarization is coated, and then a pixel electrode contact hole 96 and PAD are perforated. Finally, ITO (Indium-Tin-Oxide) for use as a pixel electrode is formed by sputtering to a thickness of 70 nm, which is then patterned so as to satisfy the specified conditions according to the present invention and to provide for the pixel electrode 97. Thereby, the TFT substrate to be used in the present invention is accomplished.

According to the features and advantages of the present invention, because that the distance between adjacent reverse tilt domains each formed in a portion of the pixel arranged corresponding to arbitrary pixel electrode is allowed to become broader than the gap between the juxtaposed pixel electrodes, or that the thickness of the liquid crystal cell sandwiched in the portion of the reverse tilt domain is allowed to become thinner than the thickness thereof in the portion of the pixel, the adverse interaction occurring between the adjacent reverse tilt domains can be suppressed effectively. Therefore, the liquid crystal display apparatus of the invention, which is capable of applying a high drive voltage without causing display defects, ensures a high numerical aperture and high contrast ratio to be achieved at the same time.

What is claimed is:

1. A method of manufacturing a liquid crystal display apparatus comprising:

providing a pair of substrates opposed to each other;

forming a plurality of pixel electrodes which are arranged in a matrix between said pair of substrates and further wherein the pixel electrodes each have a tapered region wherein a width of the electrode is gradually reduced in the tapered region and a region having a reduced width extending away from the tapered region such that the region having reduced width is located at locations of reverse tilt domains, and wherein the tapered region is formed by an inward slant of each opposite edge of the pixel electrode and the opposite edges of the pixel electrode in the region having reduced width are substantially parallel.

2. A method of manufacturing a liquid crystal display apparatus according to claim 1, wherein a width of a pixel electrode corresponding to a longitudinal direction of the reverse tilt domain is set to become narrower than a width of a pixel electrode corresponding to a portion of the pixel in which no reverse tilt domain is formed.

3. The method of manufacturing the liquid crystal display apparatus according to claim 1, wherein the gap between the juxtaposed pixel electrodes is broadened partially in a direction orthogonal to a longitudinal direction of the reverse tilt domain.

4. The method of manufacturing a liquid crystal display apparatus according to claim 1, wherein said plurality of pixel electrodes are arranged in a staggered pattern like hound's tooth.

5. The method of manufacturing a liquid crystal display apparatus according to claim 1, further comprising a barrier portion formed between the adjacent reverse tilt domains in order to reduce the thickness of the liquid crystal cell sandwiched therein.

6. The method of manufacturing a liquid crystal display apparatus according to claim 1, wherein said liquid crystal comprises a twisted nematic liquid crystal a major axis of which molecules is continuously twisted approximately 90° between said first and second orientation films.

7. The method of manufacturing a liquid crystal display apparatus according to claim 1, wherein a black matrix is formed as a shadow partially at least in a periphery of each pixel portion.

8. The method of manufacturing a liquid crystal display apparatus according to claim 1, wherein a thickness of the liquid crystal cell in the portion of the pixel is 4 μm or less.

9. The method of manufacturing a liquid crystal display apparatus according to claim 1, wherein a size of said pixel electrode is 5 μm$^2$–50 μm$^2$.

10. The method of manufacturing the liquid crystal display apparatus of claim 1, wherein opposite sides of the pixel electrode in the tapered region and region having reduced width are mirrored.

* * * * *